United States Patent [19]

Young

[11] Patent Number: 5,109,577

[45] Date of Patent: May 5, 1992

[54] CABLE-LINE SHORTENING DEVICE

[75] Inventor: Michael B. Young, Mililani, Hi.

[73] Assignee: The United States of America as represented by the Secretary of the Navy, Washington, D.C.

[21] Appl. No.: 557,450

[22] Filed: Jul. 19, 1990

[51] Int. Cl.$^5$ .............................................. B65H 75/00
[52] U.S. Cl. ..................................................... 24/71.2
[58] Field of Search ..................... 24/71.1, 71.2, 71.3; 242/100.1, 85.1; 254/216, 222

[56] References Cited

U.S. PATENT DOCUMENTS

| | | |
|---|---|---|
| 75,759 | 3/1868 | Hewett, Jr. . |
| 290,384 | 12/1883 | Atwood ................................ 24/71.2 |
| 571,751 | 11/1896 | Gulliford . |
| 1,555,351 | 9/1925 | Bognton ................................ 24/71.2 |
| 2,051,735 | 8/1936 | Michelson . |
| 2,344,052 | 3/1944 | Neale ..................................... 24/71.1 |
| 2,587,707 | 3/1952 | Dever ................................... 242/85.1 |
| 3,806,992 | 4/1974 | Reimer . |
| 3,924,819 | 12/1975 | Lapinskas ............................ 242/85.1 |
| 4,197,615 | 4/1980 | Ullom . |
| 4,700,434 | 10/1987 | Fambrough . |

Primary Examiner—James R. Brittain
Attorney, Agent, or Firm—Harvey Fendelman; Thomas Glenn Keough

[57] ABSTRACT

A device and method for shortening a cable or line includes a winding member having a winding surface for forming one or more transverse windings of an otherwise longitudinally oriented cable or line. The device includes elements located on the winding surface for redirecting the cable or line from its original longitudinal orientation to a transverse winding orientation. There may further be included an element for preventing the cable or line windings from overlapping one another.

6 Claims, 2 Drawing Sheets

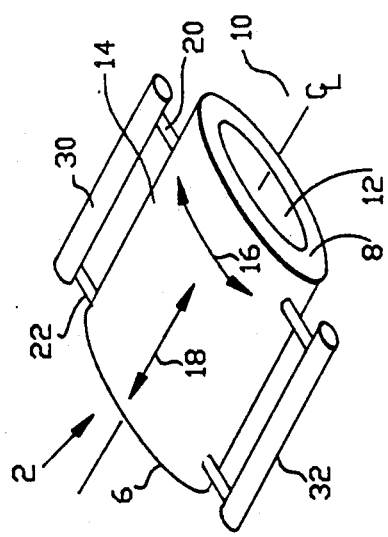
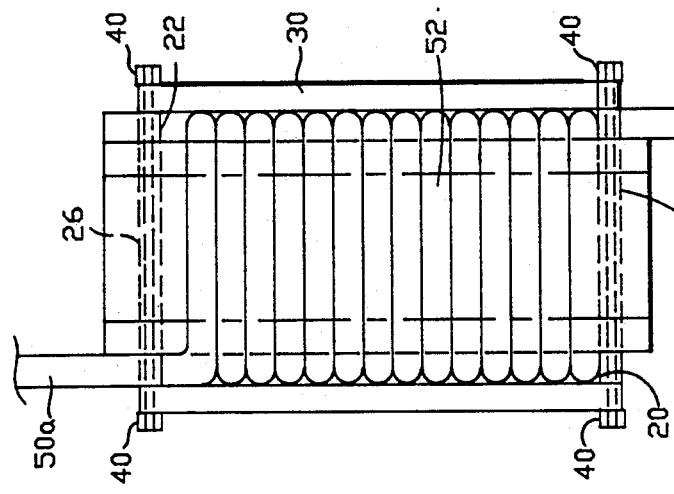
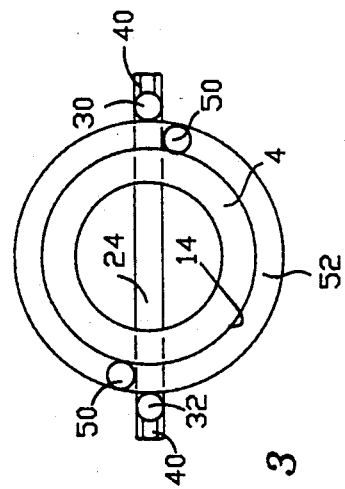
FIG. 1
FIG. 2
FIG. 3

CABLE-LINE SHORTENING DEVICE

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

The present invention relates to the field of cables, lines and the like, and more particularly to devices and methods for adjusting the length of a working cable or line without having to cut or knot it, particularly during operation, when it is not convenient, expedient or possible to shorten the cable or line by cutting and reterminating.

Applications exist wherein it is desirable to shorten the length of a working cable or line without having to cut or knot it. Electrical and telemetry cables are sometimes hung together with a load bearing line, all of great length, from a common instrumental buoy at sea. Typically, the various cables and the strength line are married together as they are fed overboard from a ship. The strength line is intended to support all loads, including the weight of the cables. During the marrying operation, some amount of slack must be built into the electrical and telemetry cables so that all the loads are supported by the taut strength line.

In order for the load bearing line to be effective, the alignment of the cables and line during the marrying operation must occur properly. It is impossible, however, to insure with total certainty that this will occur because the marrying takes place as the cables are going overboard. Any error made early in or accumulated during the evolution of the married assembly cannot be corrected later because the cables are in the water and inaccessible. If the strength line becomes longer than the other cables, the shortest cable will support the entire load.

In this situation, it would be desirable to provide a means for shortening the strength line so as to be shorter than the shortest cable after the marrying operation and thereby perform its load bearing tasks.

SUMMARY OF THE INVENTION

The present invention is directed to a device and method for shortening the length of working cable or line without having to cut and reterminate or knot it. To that end, a winding member is provided for forming one or more transverse cable or line windings about a winding surface. The windings are maintained by members which redirect the cable or line between its normal longitudinal orientation and a transverse winding orientation on the winding surface. Keeper bars attached to the members prevent the windings from overlapping one another and causing cable or line damage. Taken together, these elements form a device to store, maintain and lock excess cable or lines so as to shorten the working length thereof. In this manner, no cut end of a cable or a line has to be conditioned to an adequate strength termination or otherwise reterminated.

BRIEF DESCRIPTION OF THE DRAWING

The objects, advantages and features of this invention will be more clearly perceived from the following detailed description when read in accordance with the accompanying drawing in which:

FIG. 1 is a diagrammatic perspective view of a cable/line shortening device constructed in accordance with the present invention;

FIG. 2 is a top plan view of the cable/line shortening device of FIG. 1 fully loaded;

FIG. 3 is an end view of the cable/line shortening device of FIGS. 1 and 2; and

DETAILED DESCRIPTION OF THE PREFERRED EMBODIMENTS

Figure 5:
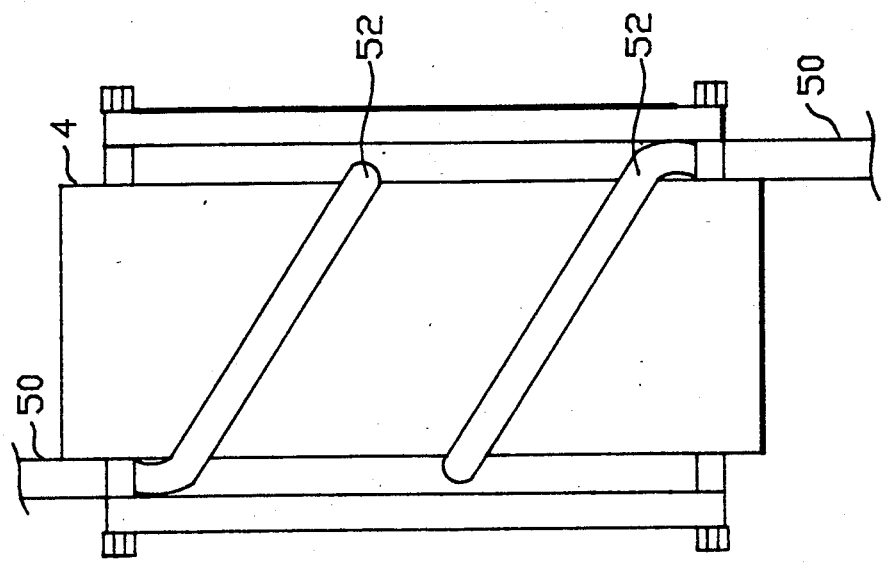
FIGS. 4 and 5 illustrate alternate winding configurations for the cable/line shortening device of FIG. 1.

Referring to FIG. 1, a cable/line shortening device 2 includes a longitudinal cylindrical winding member 4 having a first end 6, a second end 8 and a longitudinal cylindrical axis 10 extending between the first and second ends 6 and 8, respectively. The longitudinal axis 10 is oriented generally parallel with a cable or line to be shortened, as discussed hereinafter. The winding member 4 further includes an inner surface 12 and an exterior cylindrical winding surface 14 disposed around the longitudinal axis 10. The winding surface 14 has a continuous circumferential direction (illustrated by arrows 16) oriented generally perpendicular to the longitudinal axis 10. The winding surface 14 further has a finite longitudinal direction illustrated by the arrows 18 extending between the first and second ends 6 and 8, respectively.

A pair of pins 20 and 22 extend through the winding member 4 along respective diameters thereof so as to extend through the longitudinal axis 10 and through the winding surface 14 at diametrically opposing locations thereon. The pins 20 and 22 extend from the winding surface 14 a distance in excess of the cable or line diameter so as to carry cable redirection members disposed on the winding surface 14 adjacent the first and second ends 6 and 8, respectively.

Referring now to FIGS. 2 and 3, the pins 20 and 22 extend through sleeves 24 and 26 that also extend through the winding member 4. The sleeves 24 and 26 also extend approximately 1 cable or line diameter from the winding surface 14. The pins 20 and 22 extend a short distance beyond the ends of the sleeves 24 and 26 to provide a mounting location for the keeper bars and threaded fasteners described below. The ends of the pins 20 and 22 are threaded to receive the threaded fasteners.

Mounted on the respective pins 20 and 22, and extending parallel to the longitudinal axis 10, are a pair of keeper bars 30 and 32. The keeper bars 30 and 32 each have a hole at the ends thereof of sufficient size to receive a respective one of the pins 20 or 22 therein. The keeper bars 30 and 32 are positioned adjacent the ends of the sleeve members 24 and 26 such that the keeper bars 30 and 32 are spaced from the winding surface 14 a distance of substantially one diameter of the cable or line to be shortened. In this manner, the keeper bars 30 and 32 prevent the cable or line from overlapping.

The keeper bars 30 and 32 are retained on the pins 20 and 22 by means of threaded fasteners 40 which may be conventional nuts or other suitable fasteners.

Referring now to FIGS. 2 and 3, a cable or line 50 to be shortened extends past the pins 20 and 22 in a substantially longitudinal deployment orientation, wherefrom the cable or line 50 is redirected to a transverse orientation generally perpendicular to the longitudinal axis 10 for winding the cable or line 50 about the winding surface 14 in a plurality of transverse windings 52. It will thus be noted that the sleeves 24 and 26 function to receive and redirect the cable or line 50 into a transverse winding configuration. With the cable or line 50 so disposed, the keeper bars 30 and 32 are placed thereover and secured using the fasteners 40 so as to prevent the cable or line transverse windings 52 from overlapping. The diameter of the sleeves 24 and 26 is made as large as practicable to maximize the radius over which the cable or line 50 must bend in order to minimize strength or other performance degradation due to bending. Special guides, larger diameter pieces, spacers and the like may be used where small radius bending of the cable or line would otherwise occur. In this regard all bending radii are kept as large as possible.

Figure 4:
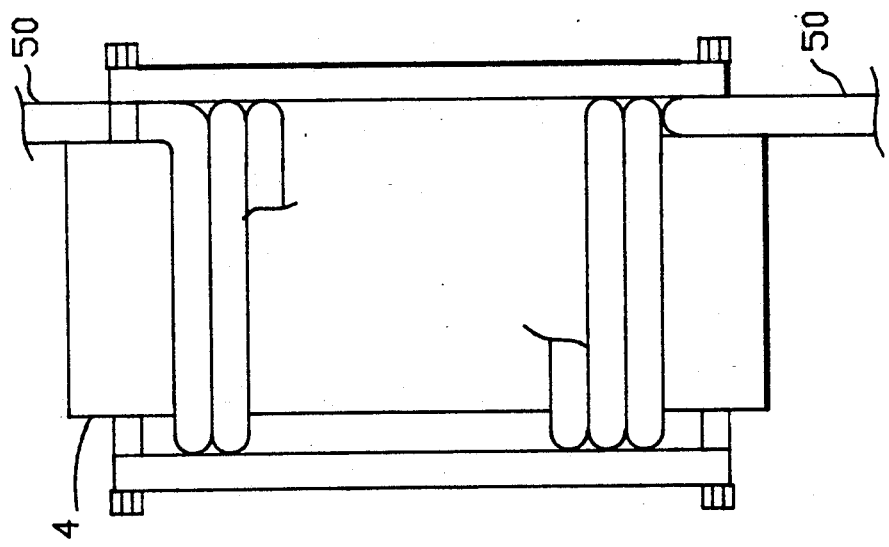

The operation or use of this invention is not limited by the example of FIG. 2. For example, FIG. 4 shows employment of the invention in such a manner that the ends of the cable or line 50 are received and redirected on the same side of the cylindrical winding member 4.

As FIG. 5 illustrates, the winding member 4 need not be filled to capacity with transverse windings 52. When less than the entire capacity of the winding member 4 is used for winding the cable or line 50, the transverse windings will be obliquely transverse to the longitudinal axis of the winding member 4.

The advantages of this invention are manifested in a shortening technique made possible with the cable/line shortening device 2, and include convenience, ease of operation, reliability and rapid application. No time consuming reterminations are required because the cable or line is not cut, and no cable weakening knots are placed in the cable or line. In addition, because the cable or line can be shortened in a non-permanent way, a single length of cable or line with the shortening device can be used to support applications where varying cable or line lengths are required. Instead of carrying several cables or lines of different lengths, only a single length and the shortening device 2 would be required.

Relatedly, the shortening technique which results from use of this invention includes unscrewing the fasteners and removing the keeper bars 30 and 32 and then engaging a cable or line which is deployed in a longitudinal orientation. The engagement of the longitudinally-deployed cable includes redirecting the cable on the sleeves 24 and 26 from its longitudinal orientation to a transverse winding orientation, and taking one or more windings in a transverse winding direction on the winding member. If the transverse windings occupy the entire capacity of the winding member, the transverse windings will lie in a direction which is generally perpendicular to the longitudinal axis of the cylindrical winding member. If the transverse windings occupy less than all of the capacity of the cylindrical winding member, the transverse windings will lie obliquely to the longitudinal axis. The keeper bars are then placed back on the cylindrical winding member and secured thereto.

It is understood that the foregoing description and accompanying illustrations are merely exemplary and are no way intended to limit the scope of the invention, which is defined solely by the appended claims in their equivalents. Various changes and modifications to the preferred embodiments should be apparent to those skilled in the art. Such changes and modifications can be made without departing from the spirit and scope of the invention. For example, the winding member 4 may be other than cylindrical. Moreover, the winding surface need not be continuous in the circumferential or longitudinal direction and could include a plurality of elements for forming the cable or line into a transverse winding. In addition, alternative ways of fastening the keeper bars to the pins are possible. In one configuration, one end of each bar could be hinged to opposite ends of one pin and the other end of each bar could be bolted to the remaining pin. In another configuration, diametric holes could be placed in opposite ends of the pins or sleeves through which the keeper bars are passed. The bars could then be bolted to the pin. Moreover, any material may be used to form the shortening device 2 so long as it is appropriate for the type of line, e.g., wire, kevlar, nylon, etc., being shortened and loads to be supported. The excess line capacity of each shortening device would be determined by its length and diameter and the size of cable or line being shortened. Where there is more excess line than can be held by a single device, several shortening devices could be used in series.

I claim:

1. A cable/line shortening device comprising:

a longitudinal winding member having a first end, a second end and a longitudinal axis extending between said first and second ends to be oriented generally parallel with a cable or line to be shortened, said winding member further including an exterior winding surface disposed around said longitudinal axis; and cable redirecting means disposed on said exterior winding surface adjacent said winding member first and second ends for receiving a cable or line to be shortened and redirecting the cable or line from a longitudinal orientation to a transverse orientation generally across said winding member longitudinal axis for winding the cable or line about said winding surface in one or more transverse windings; and means for preventing said one or more transverse windings from overlapping comprising a pair of keeper members mounted to said cable redirecting means and extending generally parallel to said winding member longitudinal axis.

2. A cable/line shortening device in accordance with claim 1 wherein:

said cable redirecting means include a pair of redirecting members extending generally perpendicular to said winding member longitudinal axis, adjacent said first and second winding member ends.

3. A cable/line shortening device in accordance with claim 1 wherein:

said winding member is substantially cylindrical.

4. A cable/line shortening device in accordance with claim 1 wherein:

said cable redirecting means include a pair of redirecting members extending through and generally perpendicular to said winding member longitudinal axis and through opposing portions of said winding surface to a distance from said winding surface of at least the diameter of a cable or line to be shortened.

5. A cable/line shortening device in accordance with claim 1 wherein:

said cable redirecting means include a pair of sleeve members extending through opposing portions of said winding surface and extending from said winding surface to a distance of at least the thickness of a cable or line to be shortened; and said pair of keeper bars are mounted on respective ends of said pair of sleeve members.

6. A cable/line shortening device comprising:

a longitudinal winding cylinder having a first end, a second end, a longitudinal axis extending between said first and second ends, and an exterior cylindrical winding surface around said longitudinal axis;

first and second members disposed adjacent said first and second winding member ends; said members extending diametrically through said longitudinal axis and through said winding surface, said members having threaded end portions;

a pair of keeper bars mounted to said first and second members on respective threaded end portions thereof, said keeper bars being postionable to distance of about one cable or line diameter from said winding surface; and threaded fasteners mounted on the threaded end portions of said members to retain said keeper bars on said members.

* * * * *